(12) United States Patent
Singh et al.

(10) Patent No.: US 10,027,589 B1
(45) Date of Patent: Jul. 17, 2018

(54) APPARATUS, SYSTEM, AND METHOD FOR ACHIEVING REDUNDANCY AND LOAD-BALANCING ACROSS COMMUNICATION LAYERS WITHIN NETWORKS

(71) Applicant: Juniper Networks, Inc., Sunnyvale, CA (US)

(72) Inventors: Nitin Singh, Fremont, CA (US); Ryan Bickhart, San Francisco, CA (US); Kaliraj Vairavakkalai, Fremont, CA (US)

(73) Assignee: Juniper Network, Inc., Sunnyvale, CA (US)

( * ) Notice: Subject to any disclaimer, the term of this patent is extended or adjusted under 35 U.S.C. 154(b) by 77 days.

(21) Appl. No.: 15/198,974

(22) Filed: Jun. 30, 2016

(51) Int. Cl.
| | |
|---|---|
| *H04L 12/761* | (2013.01) |
| *H04L 12/803* | (2013.01) |
| *H04L 29/12* | (2006.01) |
| *H04L 12/46* | (2006.01) |

(52) U.S. Cl.
CPC ........ *H04L 47/125* (2013.01); *H04L 12/4679* (2013.01); *H04L 61/103* (2013.01); *H04L 61/2069* (2013.01)

(58) Field of Classification Search
None
See application file for complete search history.

(56) References Cited

U.S. PATENT DOCUMENTS

| | | | | |
|---|---|---|---|---|
| 2003/0103507 A1* | 6/2003 | Lynch | .................... | H04L 29/06 370/392 |
| 2007/0112975 A1* | 5/2007 | Cassar | ............. | H04L 29/12933 709/239 |
| 2008/0219276 A1* | 9/2008 | Shah | .................... | H04L 12/4641 370/401 |
| 2011/0261812 A1* | 10/2011 | Kini | .................... | H04L 12/4633 370/389 |
| 2013/0227156 A1* | 8/2013 | Pirbhai | ............. | H04L 29/12028 709/228 |
| 2016/0261501 A1* | 9/2016 | Hegde | ....................... | H04L 47/12 |
| 2016/0315857 A1* | 10/2016 | Lubashev | ............. | H04W 4/025 |
| 2016/0373356 A1* | 12/2016 | Xu | ........................... | H04L 45/18 |
| 2017/0118043 A1* | 4/2017 | Hao | .................... | H04L 12/4633 |
| 2017/0141998 A1* | 5/2017 | Singh | ....................... | H04L 45/16 |
| 2017/0163530 A1* | 6/2017 | Drake | ....................... | H04L 45/66 |
| 2017/0214547 A1* | 7/2017 | Mehta | .................. | H04L 12/4633 |
| 2017/0250894 A1* | 8/2017 | Osborne | ................. | H04L 45/04 |

* cited by examiner

*Primary Examiner* — Jay P Patel
(74) *Attorney, Agent, or Firm* — FisherBroyles, LLP

(57) ABSTRACT

The disclosed method may include (1) identifying a customer edge router that is multi-homed to a provider edge router and another provider edge router, (2) determining, by the provider edge router, that the other provider edge router has identified an Internet Protocol address of the customer edge router by way of an Address Resolution Protocol, (3) learning, by the provider edge router, the Internet Protocol address of the customer edge router from the other provider edge router, and then (4) advertising, by the provider edge router to at least one gateway of at least one other customer edge router, a route that facilitates communication with the customer edge router via the provider edge router based at least in part on the Internet Protocol address of the customer edge router. Various other methods, systems, and apparatuses are also disclosed.

18 Claims, 5 Drawing Sheets

US 10,027,589 B1

APPARATUS, SYSTEM, AND METHOD FOR ACHIEVING REDUNDANCY AND LOAD-BALANCING ACROSS COMMUNICATION LAYERS WITHIN NETWORKS

BACKGROUND

Computer networks often incorporate network devices (such as routers and/or switches) that supply redundancy and/or perform load-balancing. For example, redundant Provider Edge (PE) routers may facilitate communication to a particular Customer Edge (CE) router even in the event that one of the PE routers experiences a failure. Additionally or alternatively, these PE routers may simultaneously and/or collectively forward a workload and/or flow to the CE router, thereby potentially increasing the throughput to the CE router.

However, in some scenarios, the benefits of redundancy and/or load-balancing may be unachievable with traditional networking technology. For example, in a traditional configuration, one customer's CE router may be multi-homed to redundant Ethernet Virtual Private Network (EVPN) PE routers capable of forwarding Layer 2 and Layer 3 traffic. In this example, these EVPN PE routers may interface with a Layer 3 Virtual Private Network (L3VPN) PE router that is connected to another customer's CE router but is only capable of forwarding Layer 3 traffic.

Unfortunately, due to the traditional Layer 3 advertising procedure used by the redundant EVPN PE routers, the L3VPN PE router may be unaware that the customer's CE router is multi-homed to the redundant EVPN PE routers. Instead, the L3VPN PE router may be aware of only one of the routes that lead to the customer's CE router via the redundant EVPN PE routers. As a result, the L3VPN PE router may be unable to facilitate load-balancing across the redundant EVPN PE routers when forwarding traffic to the customer's CE router. Additionally or alternatively, the L3VPN PE router may be unable to forward any traffic to the customer's CE router in the event that the EVPN PE router corresponding to the known route experiences a failure.

The instant disclosure, therefore, identifies and addresses a need for improved and/or additional methods, systems, and apparatuses for achieving redundancy and load-balancing across communication layers within networks.

SUMMARY

As will be described in greater detail below, the instant disclosure generally relates to methods, systems, and apparatuses for achieving redundancy and load-balancing across communication layers within networks. In one example, a method for accomplishing such a task may include (1) identifying a CE router that is multi-homed to a PE router and another PE router, (2) determining, by the PE router, that the other PE router has identified an Internet Protocol (IP) address of the CE router by way of an Address Resolution Protocol (ARP), (3) learning, by the PE router, the IP address of the CE router from the other PE router, and then (4) advertising, by the PE router to at least one gateway of at least one other CE router, a route that facilitates communication with the CE router via the PE router based at least in part on the IP address of the CE router.

Similarly, a system that performs the above-described method may include (1) an identification module that identifies a CE router that is multi-homed to a PE router and another PE router, (2) a determination module that determines that the other PE router has identified an IP address of the CE router by way of an ARP, (3) a learning module, stored in memory at the PE router, that learns the IP address of the CE router from the other PE router, (4) an advertising module, stored in memory at the PE router, that advertises, to at least one gateway of at least one other CE router, a route that facilitates communication with the CE router via the PE router based at least in part on the IP address of the CE router, and (5) at least one physical processor that executes the identification module, the determination module, the learning module, and the advertising module.

A corresponding apparatus may include (1) at least one storage device that stores an ARP cache that identifies one or more ARP bindings that correlate IP addresses with MAC addresses and (2) at least one physical processor communicatively coupled to the storage device at a PE router, wherein the physical processor (A) identifies a CE router that is multi-homed to the PE router and another PE router, (B) determines that the other PE router has identified an IP address of the CE router by way of ARP messaging, (C) learns an ARP binding for the CE router that includes the IP address of the CE router and the MAC address of the CE router, and (D) advertises, to at least one gateway of at least one other CE router, a route that facilitates communication with the CE router via the PE router based at least in part on the IP address of the CE router included in the ARP binding.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
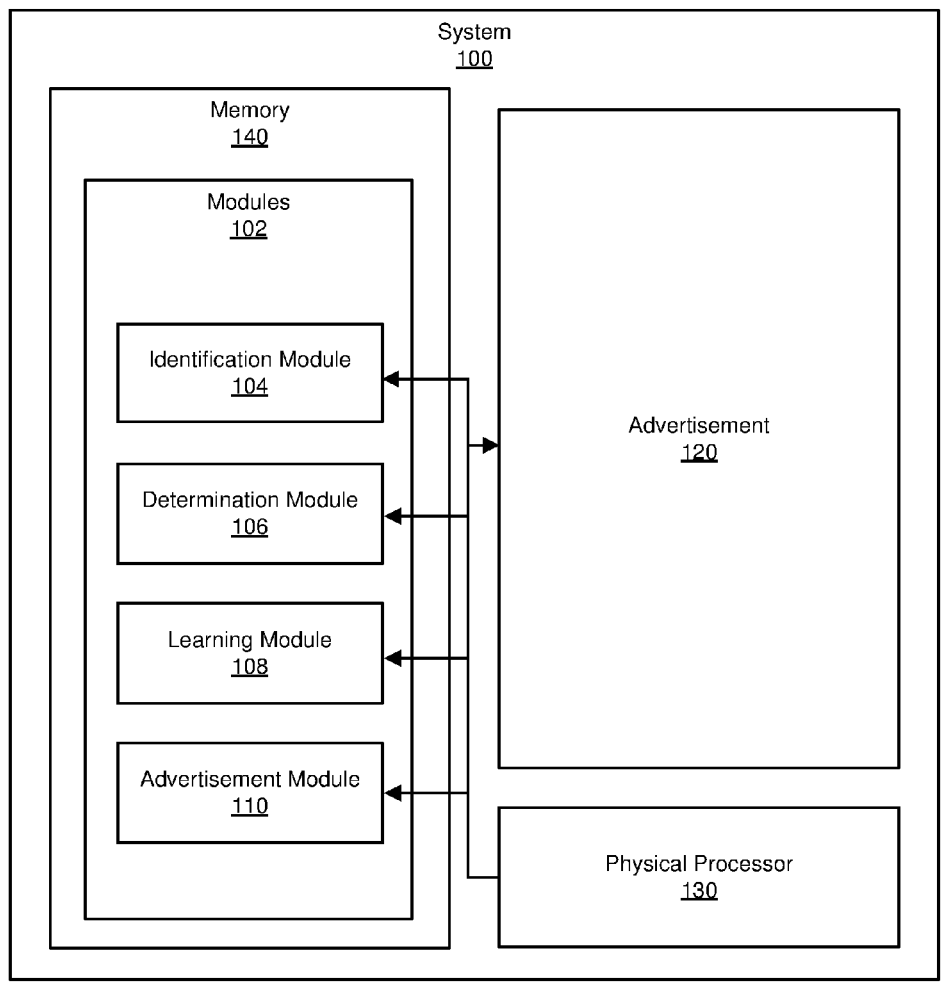
FIG. 1 is a block diagram of an exemplary apparatus for achieving redundancy and load-balancing across communication layers within networks.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for achieving redundancy and load-balancing across communication layers within networks. As will be explained in greater detail below, embodiments of the instant disclosure may involve a CE router that is multi-homed to redundant EVPN PE routers. One of these EVPN PE routers may create an ARP binding for the CE router that identifies the IP address and the MAC address of the CE router. The other EVPN PE router may query the one that created the ARP binding for the IP address of the CE router, or the EVPN PE router that created the ARP binding may simply forward the same to the other EVPN PE router.

By obtaining the IP address of the CE router in this way, the EVPN PE router that did not create the ARP binding may be able to advertise a Layer 3 route that facilitates communication with the CE router via that EVPN PE router. As a result, an L3VPN PE router that receives this advertisement for the Layer 3 route may perform load-balancing across the redundant EVPN PE routers when forwarding traffic to the CE router. Additionally or alternatively, this L3VPN PE router may be able to forward traffic to the CE router even in the event that the EVPN PE router that created the ARP binding experiences a failure. Accordingly, these embodiments of the instant disclosure may enable the EVPN PE routers to achieve redundancy and/or load-balancing across Layers 2 and 3 within a network.

Figure 2:
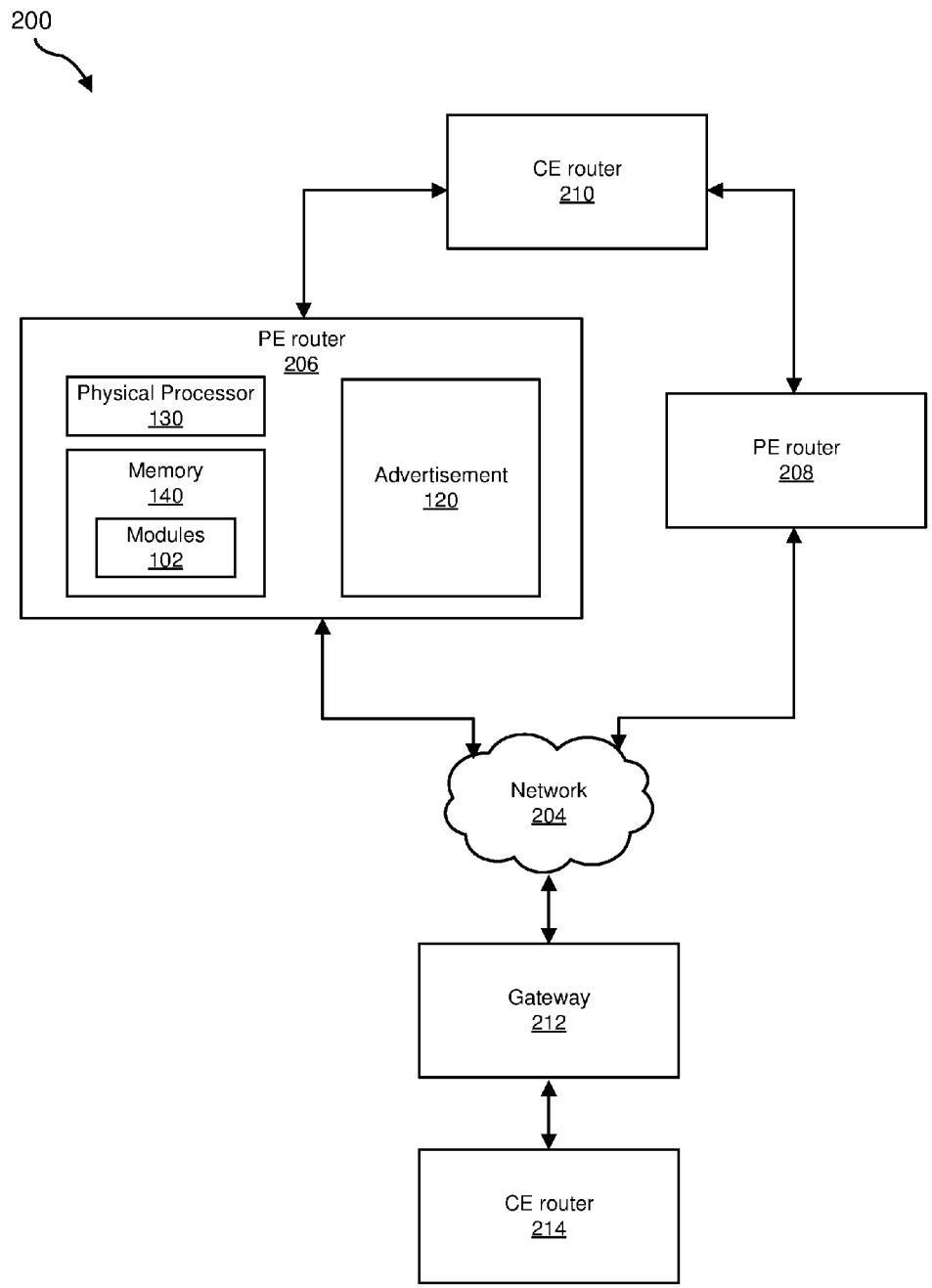
FIG. 2 is a block diagram of an exemplary apparatus for achieving redundancy and load-balancing across communication layers within networks.
Figure 3:
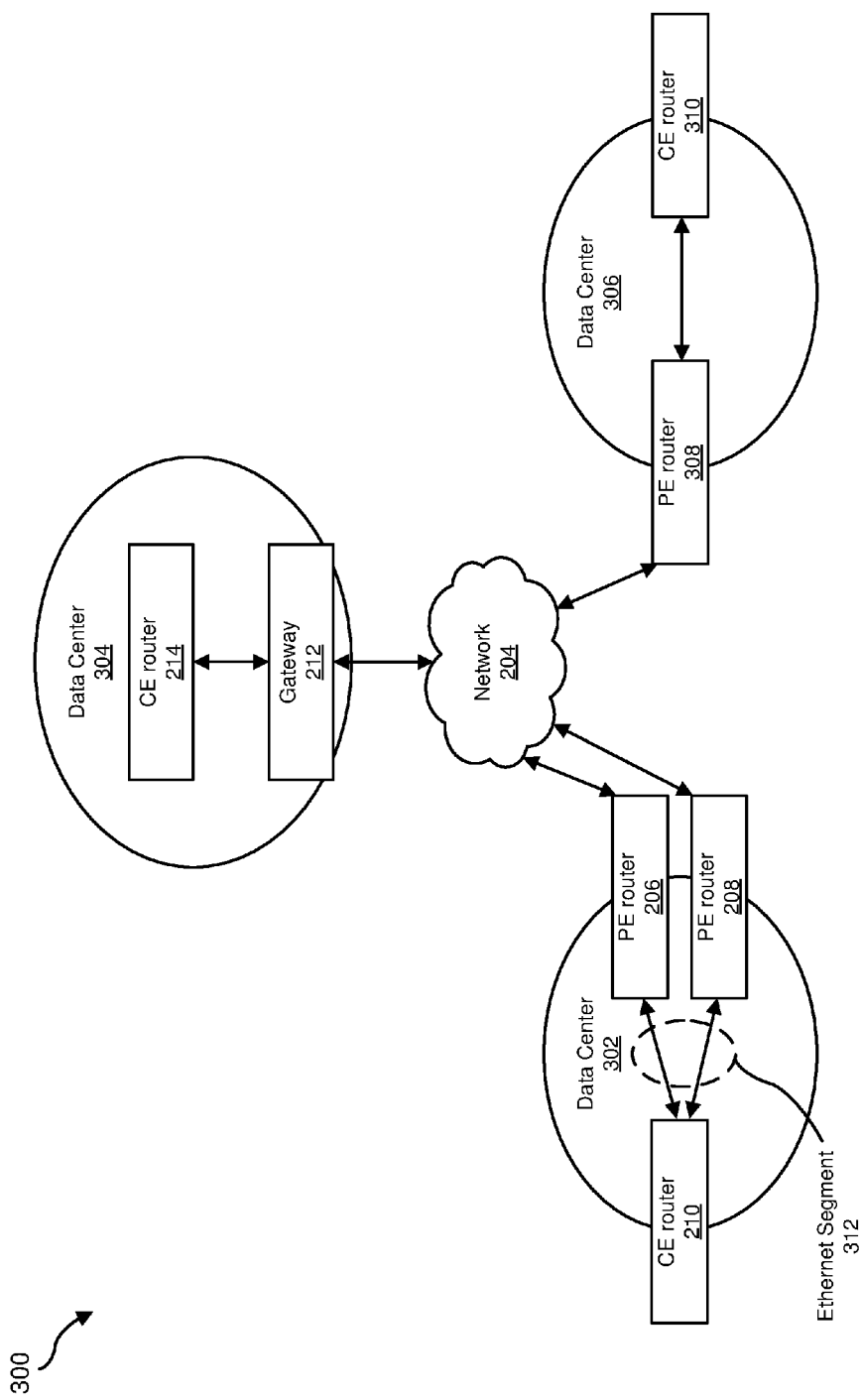
FIG. 3 is a block diagram of an exemplary apparatus for achieving redundancy and load-balancing across communication layers within networks.

The following will provide, with reference to FIGS. 1-3, examples of systems and/or apparatuses that achieve redundancy and load-balancing across communication layers within networks. The discussion corresponding to FIG. 4 will provide a detailed description of an exemplary method for achieving redundancy and load-balancing across communication layers within networks. Finally, the discussion corresponding to FIG. 5 will provide numerous examples of systems that may include the components shown in FIGS. 1-3.

FIG. 1 is a block diagram of an exemplary system 100 for achieving redundancy and load-balancing across communication layers with the networks. As illustrated in this figure, exemplary system 100 may include one or more modules 102 for performing one or more tasks. As will be explained in greater detail below, modules 102 may include an identification module 104, a determination module 106, a learning module 108, and/or an advertising module 110. Although illustrated as separate elements, one or more of modules 102 in FIG. 1 may represent portions of a single module, application, and/or framework.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as any of the devices illustrated in FIG. 2 (e.g., PE routers 206 and 208, gateway 212, and CE routers 210 and 214), any of the devices illustrated in FIG. 3 (e.g., PE router 308 and CE router 310), and/or computing system 510 in FIG. 5. One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Additionally or alternatively, memory 140 may store, load, and/or maintain an ARP cache that includes one or more ARP bindings that correlate IP addresses with MAC addresses. Examples of memory 140 include, without limitation, Random Access Memory (RAM), Read Only Memory (ROM), flash memory, Hard Disc Drives (HDDs), Solid-State Drives (SSD), optical disk drives, caches, variations or combinations of one or more of the same, and/or any other suitable memory.

As illustrated in FIG. 1, exemplary system 100 may also include one or more physical processors, such as physical processor 130. Physical processor 130 generally represents any type or form of hardware implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to achieve redundancy and/or load-balancing across communication layers (such as Layers 2 and 3) within a network. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more advertisements, such as advertisement 120. The term "advertisement," as used herein, generally refers to any type or form of communication, notification, and/or announcement that identifies and/or defines a route or path to a particular network device. In one example, advertisement 120 may identify and/or define a redundant route or path to a network device via a redundant EVPN PE router. Additionally or alternatively, advertisement 120 may identify and/or define an L3VPN route and/or IP route within a network and/or across networks. Advertisement 120 may identify and/or include the IP address of CE router 210.

Exemplary system 100 and FIG. 1 may be implemented in a variety of ways and/or contexts. For example, all or a portion of exemplary system 100 may represent portions of exemplary system 200 in FIG. 2. As shown in FIG. 2, system 200 may include a CE router 210 that is multi-homed to PE routers 206 and 208, and a CE router 214 that is single-homed to gateway 212. In this example, PE routers 206 and 208 may communicate with gateway 212 via network 204. All or a portion of the functionality of modules 102 may be performed by PE router 206, PE router 208, and/or any other suitable computing device (whether or not illustrated in FIG. 2).

As will be described in greater detail below, one or more of modules 102 from FIG. 1 may, when executed by at least one processor of PE router 206 or 208, enable PE router 206 or 208 to achieve redundancy and/or load balancing across communication layers within a network. In one example, PE router 206 and/or PE router 208 may be programmed with one or more of modules 102 that are stored in memory 140 and/or executable by physical processor 130. In this example, PE router 206 and/or PE router 208 may create and/or distribute advertisement 120. For example, PE router 206 and/or PE router 208 may insert the IP address of CE router 210 within advertisement 120 and then distribute the same to gateway 212 via network 204.

Although FIG. 2 illustrates PE routers 206 and 208 and gateway 212 as being external to network 204, one or more of these devices may alternatively represent a part of and/or be included in network 204. Similarly, although FIG. 2 illustrates CE routers 210 and 214 as being external to network 204, one or more of these routers may alternatively represent a part of and/or be included in network 204.

PE routers 206 and 208 each generally represent any type or form of computing device, system, and/or mechanism that facilitates the flow of network traffic within a service provider's network and interfaces with a network of a customer of the service provider. In some examples, PE routers 206 and 208 may include and/or represent multi-tenant routers and/or single-tenant routers located at a certain physical site. In one example, PE routers 206 and 208 may include and/or represent EVPN PE routers located at a data center of a customer of a service provider. Additional examples of PE routers 206, 208, and 212 include, without limitation, EVPN routers, L3VPN routers, Border Gateway Protocol (BGP) routers, Open Shortest Path First (OSPF) routers, Multiprotocol Label Switching (MPLS) routers, variations or combinations of one or more of the same, and/or any other suitable PE routers.

Gateway 212 generally represents any type or form of computing device, system, and/or mechanism that facilitates the flow of network traffic within a service provider's network and interfaces with a network of a customer of the service provider. In some examples, gateway 212 may include and/or represent a multi-tenant router and/or single-tenant router located at a certain physical site. In one example, gateway 212 may include and/or represent an L3VPN PE router located at a data center of a customer of a service provider. Accordingly, gateway 212 may be able to facilitate communication by way of Layer 3 but be unable to facilitate communication by way of Layer 2. Examples of gateway 212 include, without limitation, PE routers, EVPN routers, L3VPN routers, BGP routers, OSPF routers, MPLS routers, variations or combinations of one or more of the same, and/or any other suitable gateways.

CE routers 210 and 214 each generally represent any type or form of computing device, system, and/or mechanism that facilitates the flow of network traffic within a network of a customer of a service provider and interfaces with the service provider's network. In one example, CE router 210 may include and/or represent a router located at the premises of a customer of the service provider, and CE router 214 may include and/or represent a router located at the premises of another customer of the service provider. Additional examples of CE routers 210 and 214 include, without limitation, EVPN routers, L3VPN routers, BGP routers, OSPF routers, MPLS routers, variations or combinations of one or more of the same, and/or any other suitable CE routers.

Network 204 generally represents any medium or architecture capable of facilitating communication or data transfer. In one example, network 204 may facilitate communication among PE routers 206, 208, and 212. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

As another example, all or a portion of exemplary system 100 or 200 may represent portions of exemplary system 300 in FIG. 3. As shown in FIG. 3, system 300 may include data centers 302, 304, and 306 in communication with one another via network 204. In this example, data center 302 may include and/or represent CE router 210 and PE routers 206 and 208. CE router 210 may be multi-homed to PE routers 206 and 208 via Ethernet segment 312 at data center 302.

Continuing with this example, data center 304 may include and/or represent CE router 214 and gateway 212. CE router 214 may be single-homed to gateway 212 at data center 304. Additionally or alternatively, data center 306 may include and/or represent CE router 310 and PE router 308. CE router 310 may be single-homed to PE router 308 at data center 306.

Data centers 302, 304, and 306 each generally represent any type or form of facility and/or site that houses and/or accommodates computer systems and/or networks. In one example, data center 302 may include and/or represent a physical site that houses at least a portion of a network belonging to and/or administered by a customer of a service provider. In this example, data center 304 may include and/or represent a physical site that houses at least a portion of a network belonging to and/or administered by another customer of the service provider. Additionally or alternatively, data center 306 may include and/or represent a physical site that houses at least a portion of a network belonging to and/or administered by a further customer of the service provider.

Figure 4:
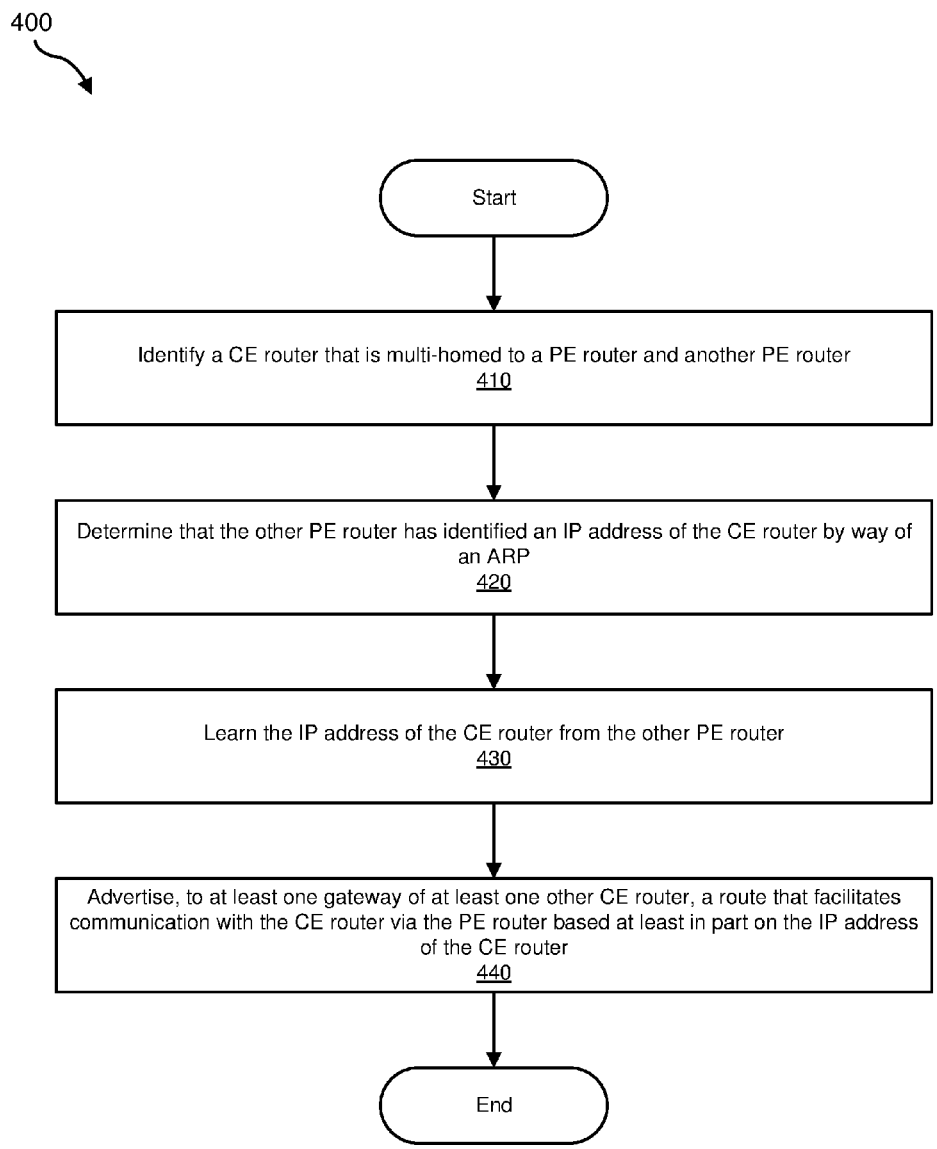
FIG. 4 is a flow diagram of an exemplary method for achieving redundancy and load-balancing across communication layers within networks.

FIG. 4 is a flow diagram of an exemplary computer-implemented method 400 for achieving redundancy and load-balancing across communication layers within networks. The steps shown in FIG. 4 may be performed by any suitable computer-executable code and/or computing system, including system 100 in FIG. 1, system 200 in FIG. 2, system 300 in FIG. 3, system 500 in FIG. 5, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 410 one or more of the systems described herein may identify a CE router that is multi-homed to a PE router and another PE router. For example, identification module 104 may, as part of PE router 206 in FIG. 2 or 3, identify CE router 210 that is multi-homed to PE routers 206 and 208. In this example, CE router 210 may be multi-homed to PE routers 206 and 208 and via a Link Aggregate Group (LAG) interface and/or bundle at data center 302. Additionally or alternatively, PE routers 206 and 208 may implement Integrated Routing and Bridging (IRB) that facilitates communication by way of both Layer 2 and Layer 3 routing and/or forwarding. In other words, IRB may enable PE routers 206 and 208 to perform both Layer 2 and Layer 3 routing and/or forwarding.

The term "Layer 2," as used herein, generally refers to the data link layer of the Open Systems Interconnection (OSI) model. Similarly, the term "Layer 3," as used herein, generally refers to the network layer of the OSI model.

The systems described herein may perform step 410 in a variety of ways and/or contexts. In some examples, identification module 104 may identify CE router 210 based at least in part on an EVPN route for CE router 210 learned by PE router 206. For example, CE router 210 may advertise an EVPN type 2 route that facilitates Layer 2 communications with CE router 210 via ARP messaging and/or signaling in the data plane. This EVPN type 2 route may identify and/or include the MAC address and/or the IP address of CE router 210. The MAC address and the IP address of CE router 210 may constitute and/or form an ARP binding for CE router 210.

In some examples, PE router 206 may receive and/or learn this EVPN type 2 route from CE router 210 and/or PE router 206. For example, PE router 208 may obtain this EVPN type 2 route directly from CE router 210 by ARP snooping. PE router 208 may then generate an ARP binding that identifies the MAC address and IP address of CE router 210. PE router 208 may store and/or maintain this ARP binding in its ARP cache. In this example, PE router 206 may be unable to obtain this EVPN type 2 route directly from CE router 210 via ARP snooping due at least in part to LAG hashing, which selects only one of the multi-homed PE routers to receive the MAC address and IP address of CE router 210 via ARP messaging.

However, PE router 206 may learn the EVPN type 2 route and/or ARP binding from PE router 208 via the EVPN control plane. Identification module 104 may then identify the EVPN type 2 route and/or ARP binding as corresponding and/or leading to CE router 210. As a result, identification module 104 may identify CE router 210 as being connected to and/or interfacing with PE router 206 and PE router 208 via Ethernet segment 312.

Additionally or alternatively, identification module 104 may identify CE router 210 during installation and/or configuration. For example, an administrator at data center 302 may connect CE router 210 to PE router 206 via Ethernet segment 312. As the administrator makes this connection, identification module 104 may identify CE router 210 as being connected to and/or interfacing with PE router 206.

In one example, identification module 104 may identify CE router 210 as also being connected to and/or interfacing with PE router 206. For example, Ethernet segment 312 may include and/or represent at least 2 physical connections that link CE router 210 to both PE router 206 and PE router 208. In this example, identification module 104 may determine that CE router 210 is multi-homed to both of PE routers 206 and 208 by virtue of Ethernet segment 312.

Returning to FIG. 4, at step 420 one or more of the systems described herein may determine that the other PE router has identified an IP address of the CE router by way of an ARP. For example, determination module 106 may, as part of PE router 206 in FIG. 2 or 3, determine that PE router 208 has identified the IP address of CE router 210 by way of ARP. In this example, the IP address may facilitate communication with CE router 210 via Layer 3 of the OSI model.

The systems described herein may perform step 420 in a variety of ways and/or contexts. In some examples, determination module 106 may determine that PE router 208 has identified the IP address of CE router 210 based at least in part by the EVPN type 2 route and/or ARP binding. For example, as described above, PE router 206 may receive and/or learn the EVPN type 2 route and/or ARP binding for CE router 210 from PE router 208 via the EVPN control plane. In this example, PE router 208 may have learned the EVPN type 2 route and/or ARP binding for CE router 210 by detecting a message (such as an ARP message) that identifies and/or includes the IP address of CE router 210. In response, PE router 208 may broadcast a request for the MAC address that corresponds to the IP address identified and/or included in the ARP message.

In one example, CE router 210 may receive this broadcast and provide a response identifying its own MAC address as corresponding to the IP address via ARP. In this example, PE router 208 may receive this response from CE router 210 via ARP and then generate the ARP binding to include the MAC address and IP address of CE router 210. PE router 208 may store and/or maintain this ARP binding in its ARP cache.

In one example, PE router 206 may be aware that CE router 210 is multi-homed to PE routers 206 and 208. In this example, PE router 206 may obtain the EVPN type 2 route and/or ARP binding for CE router 210 from PE router 208. Since PE router 206 has the EVPN type 2 route and/or ARP binding for CE router 210, determination module 106 may determine that CE router 210 has also likely advertised an L3VPN and/or IP route. Additionally or alternatively, determination module 106 may determine that PE router 208 has also likely advertised an L3VPN and/or IP route for CE router 210 to gateway 212.

This L3VPN and/or IP route may enable non-EVPN devices to communicate with CE router 210 via L3VPN and/or IP (as opposed to EVPN). For example, gateway 212 may obtain and/or receive the L3VPN and/or IP route advertised by PE router 208. In this example, gateway 212 may apply this L3VPN and/or IP route advertised by PE router 208. As a result, this L3VPN and/or IP route may enable CE router 214 to communicate with CE router 210 via gateway 212 and PE router 208.

Returning to FIG. 4, at step 430 one or more of the systems described herein may learn the IP address of the CE router from the other PE router. For example, learning module 108 may, as part of PE router 206 in FIG. 2 or 3, learn the IP address of CE router 210 from PE router 208. In other words, learning module 108 may identify the IP address of CE router 210 as obtained from PE router 208 in the EVPN type 2 route and/or ARP binding via the EVPN control plane.

The systems described herein may perform step 430 in a variety of ways and/or contexts. In some examples, learning module 108 may learn the IP address of CE router 210 based at least in part on the EVPN type 2 route and/or ARP binding for CE router 210. For example, the EVPN type 2 route and/or ARP binding may identify and/or include the MAC address and IP address of CE router 210. In this example, learning module 108 may search the EVPN type 2 route and/or ARP binding for the IP address of CE router 210. During the search, learning module 108 may identify and/or learn the IP address of CE router 210.

Returning to FIG. 4, at step 440 one or more of the systems described herein may advertise, to at least one gateway of at least one other CE router, a route that facilitates communication with the CE router via the PE router based at least in part on the IP address of the CE router. For example, advertising module 110 may, as part of PE router 206 in FIG. 2 or 3, advertise a route that facilitates communication with CE router 210 via PE router 206 based at least in part on the IP address of CE router 210. In this example, gateway 212 may receive and/or learn the route as advertised by PE router 206 in advertisement 120. This route may include and/or represent an L3VPN and/or IP route.

The systems described herein may perform step 440 in a variety of ways and/or contexts. In some examples, advertising module 110 may advertise this route as a unicast message to gateway 212 or CE router 214. In other examples, advertising module 110 may advertise this route as a multicast message to various destinations (such as gateway 212 and/or CE router 214). Additionally or alternatively, advertising module 110 may advertise this route as a broadcast message.

By advertising this route to gateway 212 and/or CE router 214, advertising module 110 may enable gateway 212 and/or CE router 214 to perform load-balancing on traffic that originates from CE router 214 and is destined for CE router 210 via PE routers 206 and 208. Additionally or alternatively, by advertising this route to gateway 212 and/or CE router 214, advertising module 110 may enable gateway 212 and/or CE router 214 to send traffic to CE router 210 via PE router 206 instead of PE router 208 in the event that PE router 208 experiences a failure, thereby supplying data center 302 with redundancy. For example, gateway 212 and/or CE router 214 may determine that PE router 208 has experienced a failure that is preventing PE router 208 from forwarding traffic to CE router 210. In this example, gateway 212 and/or CE router 214 may send the traffic to CE router 210 via PE router 206 instead of PE router 208 due at least in part to the failure.

In some examples, PE routers 206 and 208 may advertise the L3VPN and/or IP route with the same level of local preference and/or priority relative to one another. In one example, since PE routers 206 and 208 are both located at data center 302 in FIG. 3 and/or connected to CE router 210 via Ethernet segment 312, the routes and/or paths to CE router 210 via PE routers 206 and 208 may have the same level of local preference and/or priority relative to one another. For example, PE routers 206 and 208 may both advertise the L3VPN and/or IP route for CE router 210 with a local preference score of 100.

However, the routes and/or paths to CE router 210 via PE routers 206 and 208 may have different levels of local preference and/or priority than another route and/or path to CE router 210. For example, although not necessarily illustrated in this way in FIG. 3, PE router 308 may maintain connectivity with CE router 210 and/or facilitate communication with CE router 210. More specifically, PE router 308 may facilitate communication with PE router 206 and/or PE router 208 via network 204. Since, in this example, PE routers 206 and 208 facilitate communication with CE router 210 via Ethernet segment 312, PE routers 206 and 208 may forward traffic received from PE router 308 to CE router 210. In this example, PE router 308 may learn the EVPN type 2 route and/or ARP binding for CE router 210 from PE router 208 in any of the ways described above in connection with PE router 206.

In one example, the route and/or path to CE router 210 via PE router 308 may be less efficient and/or longer than the routes and/or paths to CE router 210 via PE routers 206 and 208. As a result, the route and/or path to CE router 210 via PE router 308 may have a lower (or worse) local preference and/or priority level than the routes and/or paths to CE router 210 that bypass PE router 308 and run directly from gateway 212 to PE routers 206 and 208. For example, PE router 308 may advertise the L3VPN and/or IP route for CE router 210 with a local preference score of 50.

In one example, PE routers 206 and 208 may both be active forwarders for CE router 210 in an active-active topology. In this example, PE routers 206 and 208 may both have the same local preference and/or priority levels relative to one another. However, the routes and/or paths to CE router 210 via PE routers 206 and 208 may have higher (or better) local preference and/or priority levels than the route and/or path to CE router 210 via PE router 308. In this configuration, gateway 212 may load-balance traffic across PE routers 206 and 208 to CE router 210.

However, in the event that PE router 208 experiences a failure that prevents that router from continuing to forward traffic to CE router 210, PE router 206 may assume responsibility for forwarding the entire workload and/or flow to CE router 210. Similarly, in the event that connectivity between gateway 212 and PE router 208 fails but PE router 208 remains operational, PE router 206 may assume responsibility for forwarding the entire workload and/or flow to CE router 210. In the event that connectivity between gateway 212 and both PE router 206 and PE router 208 fails but at least one of PE routers 206 and 208 remains operational, PE router 308 may assume responsibility for forwarding the entire workload and/or flow to CE router 210 via operational PE router 206 or 208.

In one example, only one of PE routers 206 and 208 may be an active forwarder (or designated forwarder) in an active-standby topology. For example, PE router 208 may serve as the designated forwarder for CE router 210. In this example, PE router 206 may be inactively standing-by as a backup in case PE router 208 experiences a failure that prevents PE router 208 from forwarding traffic to CE router 210 for one reason or another. In the event that PE router 208 experiences such a failure, PE router 206 may assume the role of designated forwarder from PE router 208. As a result, PE router 206 may assume responsibility for forwarding the entire workload and/or flow to CE router 210.

Continuing with this example, PE router 308 may be inactively standing-by as a further backup in case connectivity between gateway 212 and both PE router 206 and PE router 208 fails but at least one of PE routers 206 and 208 remains operational. In the event that connectivity between gateway 212 and both PE router 206 and PE router 208 fails but at least one of PE routers 206 and 208 remains operational, PE router 308 may assume responsibility for forwarding the entire workload and/or flow to CE router 210 via operational PE router 206 or 208. Accordingly, in this example, PE router 208 may have the highest (or best) local preference and/or priority, PE router 206 may have the next highest (or second best) local preference and/or priority, and PE router 308 may have the lowest (or worst) local preference and/or priority.

The preference and/or priority may be conveyed and/or applied in a variety of ways and/or contexts. For example, in the event that the communication at issue constitutes an intra-layer workload and/or flow, the preference and/or priority may be conveyed and/or applied via the local preference attribute in BGP. However, in the event that the communication at issue constitutes an inter-layer workload and/or flow, the preference and/or priority may be conveyed and/or applied via the Multi-Exit Discriminator (MED) attribute in BGP.

Figure 5:
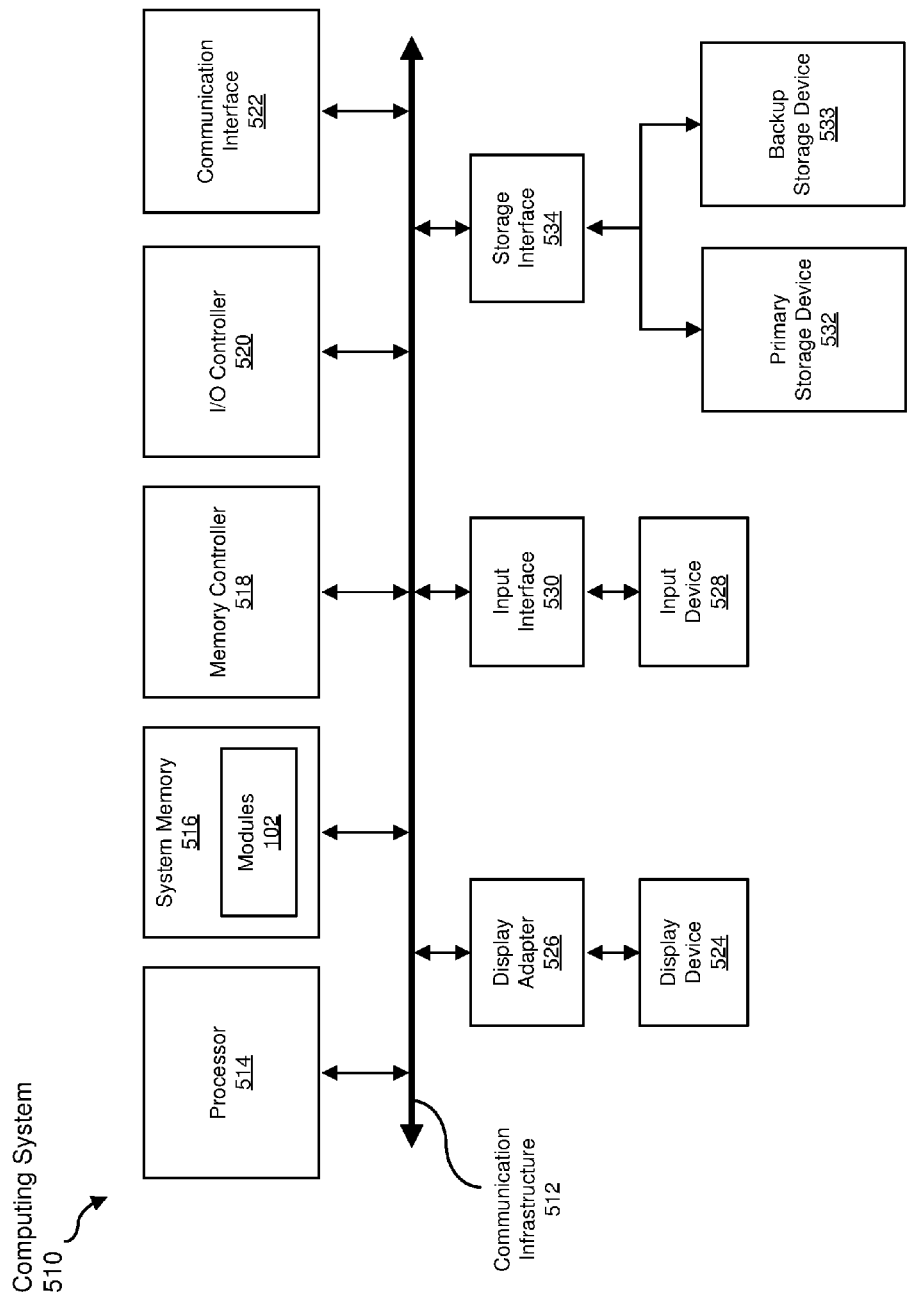
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 3. All or a portion of computing system 500 may also perform and/or be a means for performing and/or implementing any other steps, methods, or processes described and/or illustrated herein. In one example, computing system 500 may include and/or represent an apparatus that facilitates achieving redundancy and load-balancing across communication layers within networks.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying a customer edge router that is multi-homed to a provider edge router and another provider edge router;
   determining, by the provider edge router, that the other provider edge router has identified an Internet Protocol address of the customer edge router by way of an Address Resolution Protocol;

learning, by the provider edge router, the Internet Protocol address of the customer edge router from the other provider edge router;

advertising, by the provider edge router to at least one gateway of at least one other customer edge router, a route that facilitates communication with the customer edge router via the provider edge router based at least in part on the Internet Protocol address of the customer edge router; and enabling the other customer edge router to perform load-balancing on traffic that originates from the other customer edge router and is destined for the customer edge router via the provider edge router and the other provider edge router.

2. The method of claim 1, wherein:

the provider edge router and the other provider edge router facilitate communication by way of both:
  Layer 2 of the Open Systems Interconnection model; and
  Layer 3 of the Open Systems Interconnection model; and
the gateway facilitates communication by way of Layer 3 of the Open Systems Interconnection model and does not facilitate communication by way of Layer 2 of the Open Systems Interconnection model.

3. The method of claim 2, wherein the provider edge router and the other router facilitate communication by way of Layer 2 and Layer 3 using Integrated Routing and Bridging (IRB).

4. The method of claim 1, wherein the route comprises an Internet Protocol route that defines a path to the customer edge router through the provider edge router using the Internet Protocol address of the customer edge router.

5. The method of claim 1, wherein the other provider edge router identifies the Internet Protocol address of the customer edge router by:

detecting, by the other provider edge router, at least one message that identifies the Internet Protocol address;

broadcasting, by the other provider edge router, a request for a Media Access Control address that corresponds to the Internet Protocol address via the Address Resolution Protocol;

receiving, by the other provider edge router, a response that identifies the Media Access Control address of the customer edge router as corresponding to the Internet Protocol address via the Address Resolution Protocol; and generating, based at least in part on the message and the response, an Address Resolution Protocol binding that identifies the Internet Protocol address and the Media Access Control address of the customer edge router.

6. The method of claim 5, wherein:

the message comprises an Address Resolution Protocol message; and detecting the message that identifies the Internet Protocol address comprises detecting the Address Resolution Protocol message via a data plane.

7. The method of claim 5, wherein learning the Internet Protocol address of the customer edge router from the other provider edge router comprises obtaining the Internet Protocol address of the customer edge router from the Address Resolution Protocol binding at the other provider edge router.

8. The method of claim 5, wherein learning the Internet Protocol address of the customer edge router from the other provider edge router comprises obtaining the Internet Protocol address of the customer edge router from the other provider edge router via an Ethernet Virtual Private Network (EVPN) control plane.

9. The method of claim 1, wherein advertising the route to the gateway of the other customer edge router comprises enabling the other customer edge router to:

determine that the other provider edge router has experienced a failure that is preventing the other provider edge router from forwarding traffic to the customer edge router; and send traffic to the customer edge router via the provider edge router instead of the other provider edge router due at least in part to the failure.

10. A system comprising:

an identification module, stored in memory, that identifies a customer edge router that is multi-homed to a provider edge router and another provider edge router;

a determination module, stored in memory at the provider edge router, that determines that the other provider edge router has identified an Internet Protocol address of the customer edge router by way of an Address Resolution Protocol;

a learning module, stored in memory at the provider edge router, that learns the Internet Protocol address of the customer edge router from the other provider edge router;

an advertising module, stored in memory at the provider edge router, that:

advertises, to at least one gateway of at least one other customer edge router, a route that facilitates communication with the customer edge router via the provider edge router based at least in part on the Internet Protocol address of the customer edge router; and enables the other customer edge router to perform load-balancing on traffic that originates from the other customer edge router and is destined for the customer edge router via the provider edge router and the other provider edge router; and at least one physical processor that executes the identification module, the determination module, the learning module, and the advertising module.

11. The system of claim 10, wherein:

the provider edge router and the other provider edge router facilitate communication by way of both:
  Layer 2 of the Open Systems Interconnection model; and
  Layer 3 of the Open Systems Interconnection model; and
the gateway facilitates communication by way of Layer 3 of the Open Systems Interconnection model and does not facilitate communication by way of Layer 2 of the Open Systems Interconnection model.

12. The system of claim 11, wherein the provider edge router and the other router facilitate communication by way of Layer 2 and Layer 3 using Integrated Routing and Bridging (IRB).

13. The system of claim 10, wherein the route comprises an Internet Protocol route that defines a path to the customer edge router through the provider edge router using the Internet Protocol address of the customer edge router.

14. The system of claim 10, wherein the other provider edge router identifies the Internet Protocol address of the customer edge router by:

detecting, by the other provider edge router, at least one message that identifies the Internet Protocol address;

broadcasting, by the other provider edge router, a request for a Media Access Control address that corresponds to the Internet Protocol address via the Address Resolution Protocol;

receiving, by the other provider edge router, a response that identifies the Media Access Control address of the customer edge router as corresponding to the Internet Protocol address via the Address Resolution Protocol; and generating, based at least in part on the message and the response, an Address Resolution Protocol binding that identifies the Internet Protocol address and the Media Access Control address of the customer edge router.

15. The system of claim 14, wherein:
the message comprises an Address Resolution Protocol message; and
the other provider edge router detects the message that identifies the Internet Protocol address comprises detecting the Address Resolution Protocol message via a data plane.

16. The system of claim 14, wherein the learning module learns the Internet Protocol address of the customer edge router from the other provider edge router by obtaining the Internet Protocol address of the customer edge router from the Address Resolution Protocol binding at the other provider edge router.

17. The system of claim 14, wherein the learning module learns the Internet Protocol address of the customer edge router from the other provider edge router by obtaining the Internet Protocol address of the customer edge router from the other provider edge router via an Ethernet Virtual Private Network (EVPN) control plane.

18. An apparatus comprising:
at least one storage device that stores an Address Resolution Protocol cache that identifies one or more Address Resolution Protocol bindings that correlate Internet Protocol addresses with Media Access Control addresses;
at least one physical processor communicatively coupled to the storage device at a provider edge router, wherein the physical processor:
identifies a customer edge router that is multi-homed to the provider edge router and another provider edge router;
determines that the other provider edge router has identified an Internet Protocol address of the customer edge router by way of Address Resolution Protocol messaging;
learns an Address Resolution Protocol binding for the customer edge router that includes the Internet Protocol address of the customer edge router and the Media Access Control address of the customer edge router;
advertises, to at least one gateway of at least one other customer edge router, a route that facilitates communication with the customer edge router via the provider edge router based at least in part on the Internet Protocol address of the customer edge router included in the Address Resolution Protocol binding; and
enables the other customer edge router to perform load-balancing on traffic that originates from the other customer edge router and is destined for the customer edge router via the provider edge router and the other provider edge router.

* * * * *